(12) United States Patent
Tsuchiya et al.

(10) Patent No.: US 8,154,828 B2
(45) Date of Patent: Apr. 10, 2012

(54) MAGNETORESISTIVE EFFECT ELEMENT IN CPP-TYPE STRUCTURE AND MAGNETIC DISK DEVICE

(75) Inventors: Yoshihiro Tsuchiya, Tokyo (JP); Shinji Hara, Tokyo (JP); Kiyoshi Noguchi, Tokyo (JP); Migaku Takahashi, Miyagi (JP); Masakiyo Tsunoda, Miyagi (JP)

(73) Assignee: TDK Corporation, Tokyo (JP)

( * ) Notice: Subject to any disclaimer, the term of this patent is extended or adjusted under 35 U.S.C. 154(b) by 458 days.

(21) Appl. No.: 12/500,835

(22) Filed: Jul. 10, 2009

(65) Prior Publication Data

US 2011/0007420 A1    Jan. 13, 2011

(51) Int. Cl.
G11B 5/39    (2006.01)
(52) U.S. Cl. .................................. 360/324.12
(58) Field of Classification Search ........ 360/324–324.2
See application file for complete search history.

(56) References Cited

U.S. PATENT DOCUMENTS

| | | | |
|---|---|---|---|
| 7,884,403 B2* | 2/2011 | Yuasa | 257/295 |
| 2005/0104101 A1* | 5/2005 | Sun et al. | 257/295 |
| 2007/0128470 A1* | 6/2007 | Nagahama et al. | 428/811.1 |
| 2008/0026253 A1* | 1/2008 | Yuasa et al. | 428/811 |

FOREIGN PATENT DOCUMENTS

| | | |
|---|---|---|
| JP | A-H06-195645 | 7/1994 |
| JP | A-2008-004956 | 1/2008 |
| JP | A-2008-034523 | 2/2008 |
| JP | A-2008-091842 | 4/2008 |
| JP | A-2008-235528 | 10/2008 |
| JP | A-2009-027177 | 2/2009 |

OTHER PUBLICATIONS

U.S. Appl. No. 12/500,907, filed Jul. 10, 2009, Hara et al.

* cited by examiner

*Primary Examiner* — Will J Klimowicz
(74) *Attorney, Agent, or Firm* — Posz Law Group, PLC (57) ABSTRACT

An MR element in a CPP structure includes a spacer layer made of Cu, a magnetic pinned layer containing CoFe and a free layer containing CoFe that are laminated to sandwich the spacer layer. The free layer is located below the magnetic pinned layer. The free layer is oriented in a (001) crystal plane, the spacer layer is formed and oriented in a (001) crystal plane on the (001) crystal plane of the free layer. Therefore, in a low resistance area where an area resistivity (AR) of the MR element is, for example, lower than 0.3 $\Omega \cdot \mu m^2$, an MR element that has a large variation of a resistance is obtained.

7 Claims, 4 Drawing Sheets

MAGNETORESISTIVE EFFECT ELEMENT IN CPP-TYPE STRUCTURE AND MAGNETIC DISK DEVICE

CROSS REFERENCE TO RELATED APPLICATION

This application is related to U.S. application Ser. No. 12/500,907, entitled "MAGNETORESISTIVE EFFECT ELEMENT IN CPP-TYPE STRUCTURE AND MAGNETIC DISK DEVICE," filed on Jul. 10, 2009.

BACKGROUND OF INVENTION

1. Field of Invention

The present invention relates to a magnetoresistive effect element (MR element) in a CPP-type structure that detects magnetic field intensity as a signal from a magnetic recording medium, and so on, a thin film magnetic head with the MR element, and a head gimbal assembly and a magnetic disk device that have the thin film magnetic head.

2. Description of Related Art

In recent years, with an increase in the high recording density of a magnetic disk drive (HDD), there have been growing demands for improvements in the performance of a thin film magnetic head. For a thin film magnetic head, a composite type thin film magnetic head has been widely used; it has a structure where a reproducing head having a read-only magnetoresistive effect element (hereinafter, magneto-resistive (MR) element), and a writing head having a write-only induction type magnetic conversion element are laminated together.

Generally, a shield layer is formed in a reproducing head to restrict an area of a medium that interferes with a reproducing element. Currently, in a conventional mainstream head structure, a first shield layer, a second shield layer and an MR element are connected in series without an intershield insulating layer. This structure is referred to as an MR element in a current perpendicular to plane type (CPP-type) structure. In consideration of the efficiency of heat radiation and maintenance of an output, and so on, a CPP-type structure is an essential technology to realize a high recording density of 500 Gbits/in$^2$ or more.

A general CPP-type element with a spin valve is briefly explained below. A typical spin valve CPP-type element is formed by a lamination structure for its main layers as follows: a lower electrode layer/an under layer/an antiferromagnetic layer/a ferromagnetic layer (1)/a spacer layer/a ferromagnetic layer (2)/a cap layer/an upper electrode layer. The top most layer is the upper electrode layer, and the bottom most layer is the lower electrode layer. In the specification, a lamination layer may be described as having the above format.

A magnetization direction of the ferromagnetic layer (1), which is one of the ferromagnetic layers, is pinned in the perpendicular direction to a magnetization direction of the ferromagnetic layer (2) when the externally applied magnetic field is zero. The ferromagnetic layer (2) is generally referred to as a magnetic free layer. The magnetization direction of the ferromagnetic layer (1) can be pinned by making an antiferromagnetic layer adjacent thereto and providing unidirectional anisotropic energy (also referred to as "exchange bias" or "coupling magnetic field") to the ferromagnetic layer (1) by means of exchange-coupling between the antiferromagnetic layer and the ferromagnetic layer (1). For this reason, the ferromagnetic layer (1) is also referred to as a magnetic pinned layer.

As mentioned above, a CPP-type element that is configured with a connection between a shield layer and an MR element through a metal is advantageous because it increases heat radiation efficiency and operating electric current. In this element, a smaller cross sectional area of an element has a larger resistance value and a larger resistance variation. Namely, it is an appropriate structure for a, so called, narrower track that narrows a track width. A narrower track width increases a track per inch (TPI), and it is an essential technology for increasing the recording density of an HDD.

However, in view of the high frequency characteristic of the above element, an extreme increase in the resistance of such an element is unfavorable. In other words, with the recent increase in the recording density, it is necessary to improve the high frequency characteristic of a reproducing signal. In order to improve the high frequency characteristic of a reproducing signal, it is important to match the following factors: an impedance of an MR element part; an impedance of an amplifier; and an impedance of a transmission line connecting the MR element part; and the amplifier. Since these impedance values are restricted by an impedance of a transmission line, an MR element needs to have a lower resistance value to improve the high frequency characteristic. Therefore, research and development has been conducted for a CPP-GMR element that has a spacer layer made of a low resistance material instead of having a TMR element with a tunnel barrier that has a high resistance value.

With consideration of the situation described above, the present invention is provided. An object of the present invention is to provide an MR element having a large magnetoresistive variation in a lower resistance area that has a resistance value of 0.3 $\Omega\mu m^2$ or smaller with respect to its area resistivity (AR), a thin film magnetic head that has the MR element mentioned above, and a head gimbal assembly and a magnetic disk device that have the thin film magnetic head mentioned above.

As related art that may be related to the present invention and that discloses a method to increase an MR ratio of a CPP-GMR element, the following four references are given by an example.

(1) Japanese laid-open patent publication No. 2008-34523 discloses that, in a current confined path (CCP)—current perpendicular to plane (CPP) type giant magnetoresistive effect element (GMR) having a magnetic pinned layer, an intermediate layer, and a magnetic free layer, the GMR element is configured with the intermediate layer that is made of single crystalline or polycrystalline magnesium oxide (MgO) with a layer thickness of 1 nm or lower. The intermediate layer is preferentially oriented with a (001) crystal plane and a BCC-CoFe (001) structure is formed over the intermediate layer.

However, the magnesium oxide (MgO) of the intermediate layer is not an intended material of the present invention and is not an appropriate material for decreasing resistance.

(2) Japanese laid-open patent publication No. 2008-4956 proposes that, in an MR element with a magnetic tunnel junction structure that includes a first ferromagnetic material with a BCC structure formed on a first plane of a tunnel barrier layer and a second ferromagnetic material with a BCC structure formed on a second plane of the tunnel barrier layer, the MR element is configured with the tunnel barrier layer made of either single crystalline MgO (001) or polycrystalline MgO in which a (001) crystal plane is priority oriented, the first ferromagnetic material made of either Fe (001) or an Fe alloy system (001), and the second ferromagnetic material made of either Fe (001) or an Fe alloy system (001).

However, the magnesium oxide (MgO) of the tunnel barrier layer is not an intended material of the present invention and is not an appropriate material for decreasing resistance.

(3) Japanese laid-open patent publication No. 2008-235528 proposes that an MR element is configured with the following layers in a bottom up direction; an under layer that is made of NiFeN and is formed on a main surface of a substrate, a pinning layer that is made of an antiferromagnetic material containing Ir and Mn and is formed on the under layer, a reference layer that is made of a ferromagnetic material in which a magnetization direction is pinned by exchange-coupling with the pinning layer directly or indirectly through another ferromagnetic layer and is formed on the pinning layer, a nonmagnetic layer that is made of a nonmagnetic material and is formed on the reference layer, and a free layer that is made of a ferromagnetic material in which a magnetization direction varies depending on the externally applied magnetic field and is formed on the nonmagnetic layer.

However, this reference does not disclose or suggest a combination of an under layer made of NiFeN and a CoFe layer made on the under layer. The nonmagnetic layer is made of MgO. The magnesium oxide (MgO) of the nonmagnetic layer is not an intended material of the present invention and is not an appropriate material for decreasing resistance.

(4) Japanese laid-open patent publication No. H06-195645 discloses a magnetoresistive effect type head configured with a magnetoresistive effect film that is made of a NiFe alloy, a magnetic material with magnetoresistive effect, and a magnetic sensitive part made of a NiFe alloy in which a plane direction is oriented as a (100) orientation with respect to a layer surface of the magnetoresistive effect film.

However, this reference is related to a magnetic layer made of a NiFe alloy. This reference does not disclose or suggest a combination of CoFe in a (001) orientation and Cu in a (001) orientation.

SUMMARY OF INVENTION

In order to solve the above drawbacks, a magnetoresistive effect element (MR element) of the present invention that is a giant magnetoresistive effect element in a current perpendicular to plane (CPP) structure includes a spacer layer made of Cu, a magnetic pinned layer containing CoFe and a free layer containing CoFe that are laminated to sandwich the spacer layer, in which a sense current flows along a lamination direction of the layers. The free layer is formed before the magnetic pinned layer is formed, and is located below the magnetic pinned layer. A magnetization direction of the free layer varies depending on an externally applied magnetic field, and a magnetization direction of the magnetic pinned layer is pinned. The free layer is oriented in a (001) crystal plane, and the spacer layer is formed and oriented in a (001) crystal plane on the (001) crystal plane of the free layer.

As a preferred embodiment of the present invention, the magnetic pinned layer is formed and oriented in a (001) crystal plane on the (001) crystal plane of the spacer layer.

As a preferred embodiment of the present invention, an under layer containing a NiFeN layer that is oriented in a (001) crystal plane is formed below the free layer, the free layer is a first ferromagnetic layer and is formed on the under layer, and the spacer layer is formed on the first ferromagnetic layer.

As a preferred embodiment of the present invention, the magnetic pinned layer is formed and oriented in a (001) crystal plane on the (001) crystal plane of the spacer layer.

A thin film magnetic head of the present invention includes an air bearing surface (ABS) that is opposite to a recording medium, the magnetoresistive effect element (MR element) described above that is provided in the vicinity of the ABS to detect a signal magnetic field from the recording medium, and a pair of electrodes that apply an electric current in a lamination direction of the MR element.

A head gimbal assembly of the present invention includes a slider having the thin film magnetic head described above and being provided opposite to a recording medium, and a suspension elastically supporting the slider.

A magnetic disk device of the present invention includes a slider having the thin film magnetic head described above and being provided opposite to a recording medium; and a positioning device supporting the slider and locating a position of the slider with respect to the recording medium.

BRIEF DESCRIPTION OF DRAWINGS

FIG. 2 is a sectional view of a thin film magnetic head that is perpendicular to an ABS to a recording medium and a substrate according to one embodiment of the present invention, and it is also.

DETAILED DESCRIPTION

The best mode for implementing the present invention will be described in detail hereafter.

Figure 1:
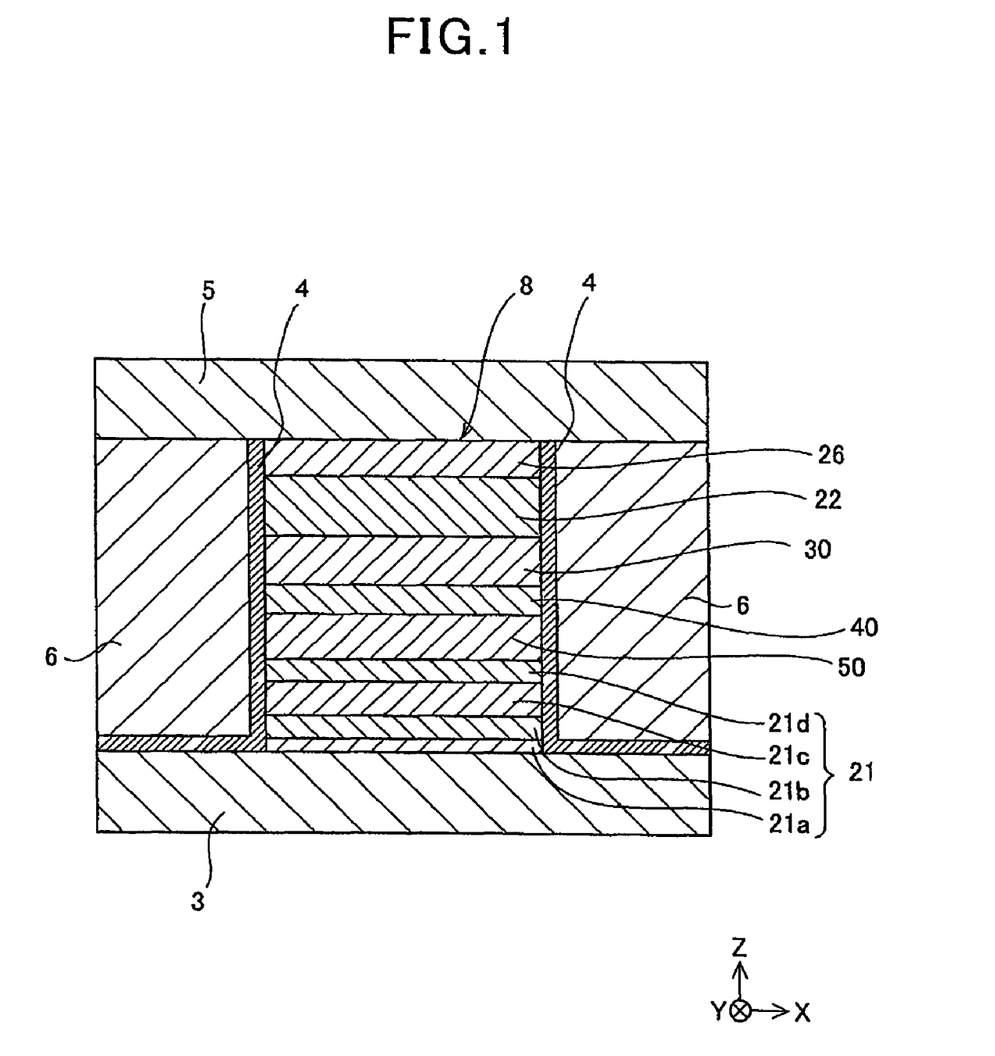
FIG. 1 is a sectional view of a reproducing head that is parallel to an opposing medium surface (or air bearing surface, ABS) to a recording medium according to one embodiment of the present invention.

FIG. 1 is a schematic view of an air bearing surface (ABS) of a reproducing head according to one embodiment of the present invention. Specifically, it shows the ABS of a giant magnetoresistive effect element in a CPP-type structure (CPP-GMR element), which is a main part of the present invention. The ABS generally corresponds to a surface at which a reproducing head is in opposition to a recording medium (hereinafter often called the opposing medium surface or ABS), however, it is understood that the ABS of the present invention includes not only the surface but also a section where a lamination structure of the element can be clearly observed. For instance, a passivation layer of diamond-like carbon (DLC) or the like (the passivation layer adapted to cover the element), in a strict sense, positioned at the ABS may be omitted if necessary.

Figure 2:
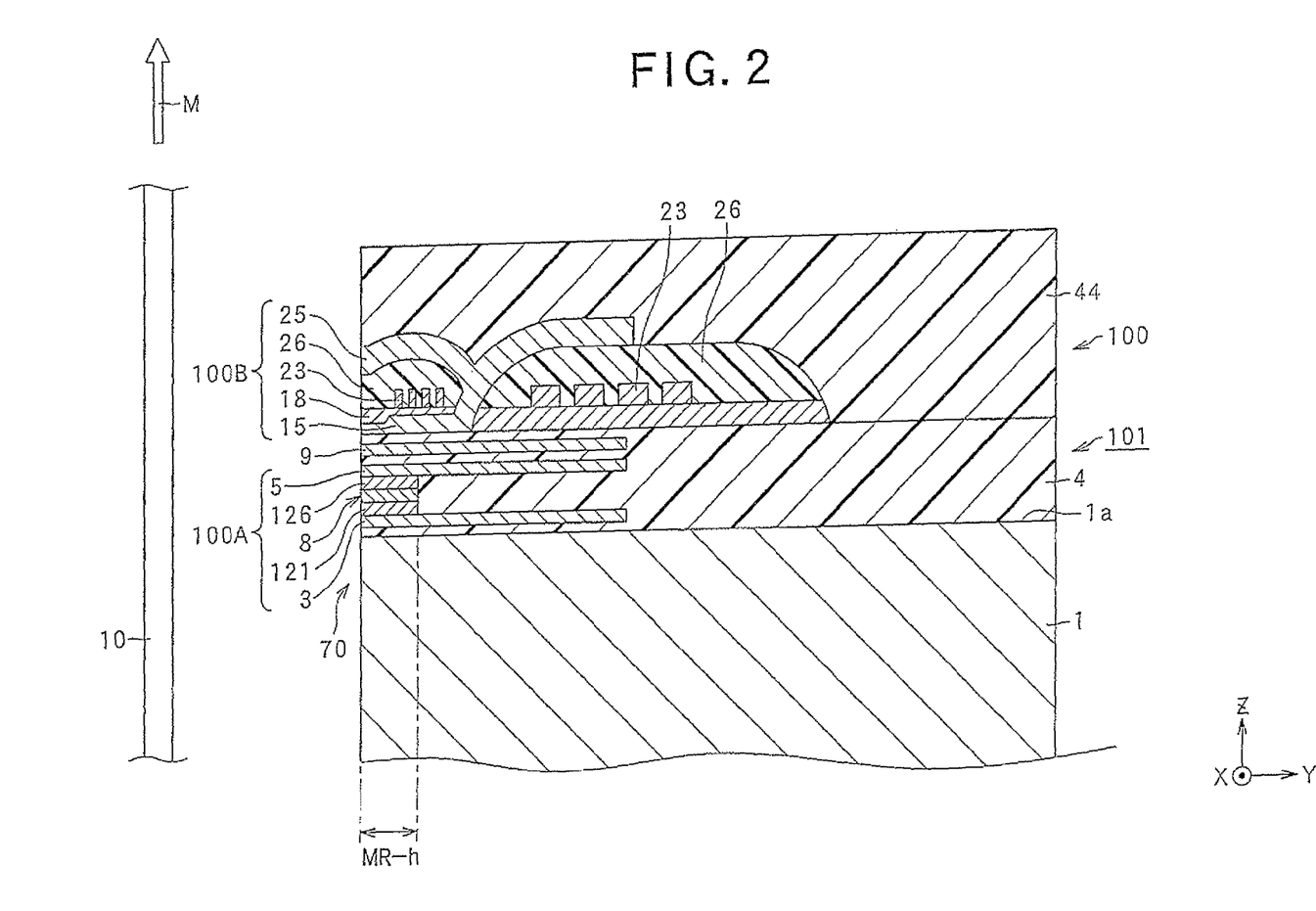
FIG. 2 is a view for explaining the structure of the thin film magnetic device. Particularly.

FIG. 2 is a sectional view of a thin film magnetic head that is perpendicular to an ABS and a substrate according to one embodiment of the present invention, and it is also for explaining the structure of the thin film magnetic head.

Figure 3:
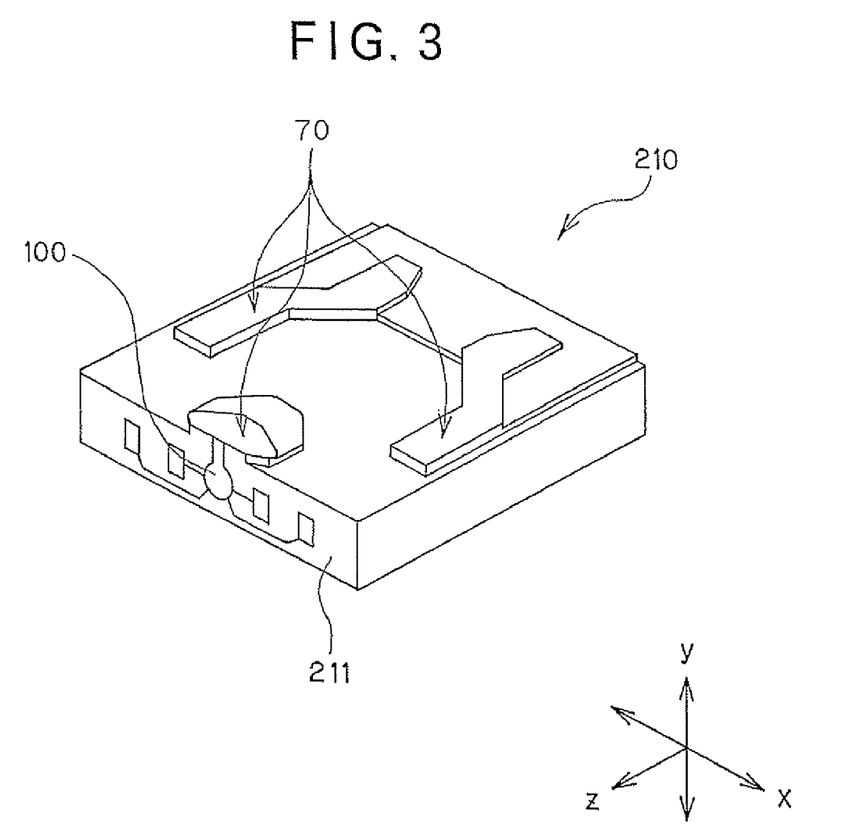
FIG. 3 is a perspective view of a slider that is a part of a head gimbal assembly according to one embodiment of the present invention.
Figure 4:
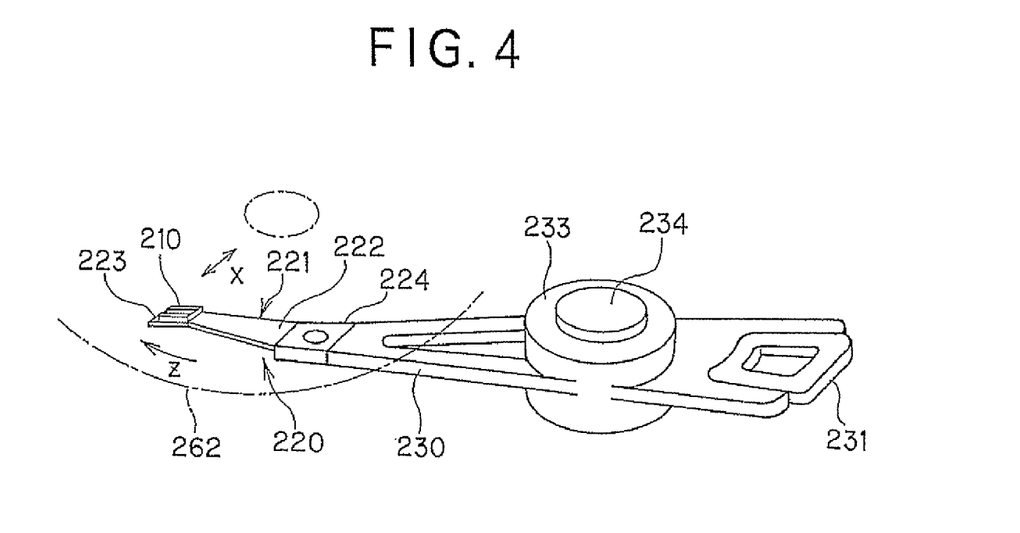
FIG. 4 is a perspective view of a head arm assembly that contains a head gimbal assembly according to one embodiment of the present invention.
Figure 5:
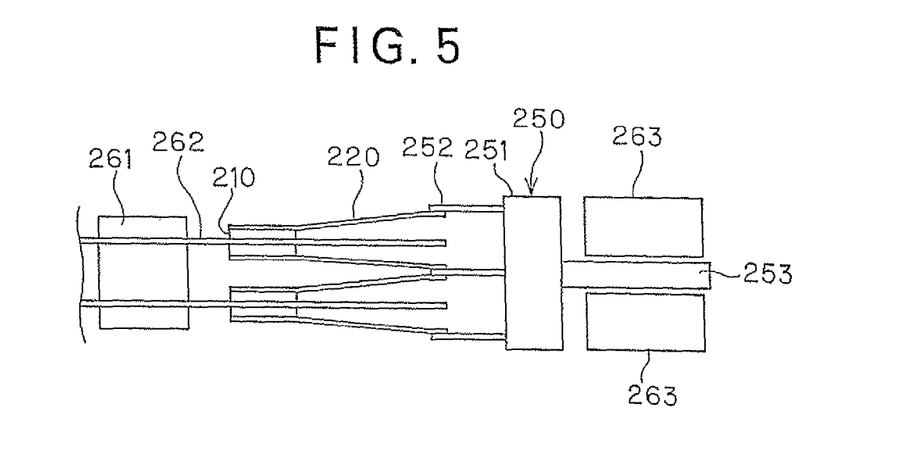
FIG. 5 is an illustration for explaining primary parts of a magnetic disk device according to one embodiment of the present invention.
Figure 6:
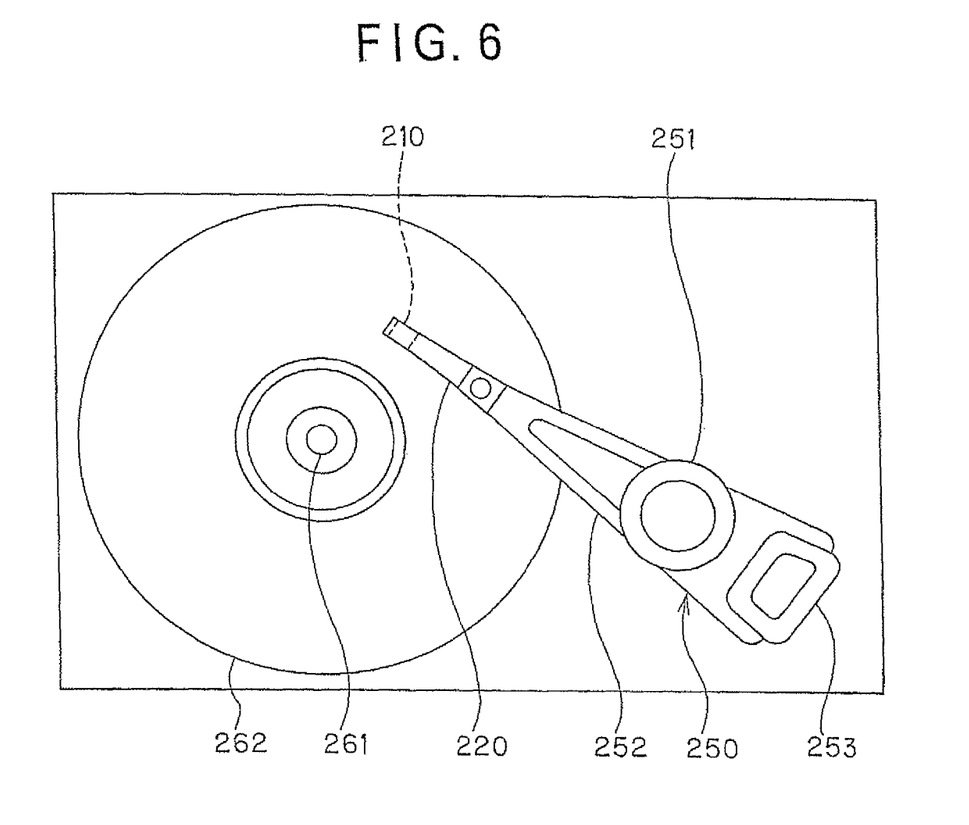
FIG. 6 is a top plan view of a magnetic disk device according to one embodiment of the present invention.

FIG. 3 is a perspective view of a slider that is a part of a head gimbal assembly according to one embodiment of the present invention. FIG. 4 is a perspective view of a head arm assembly that contains a head gimbal assembly according to one embodiment of the present invention. FIG. 5 is an illustration for explaining primary parts of a magnetic disk device according to one embodiment of the present invention. FIG. 6 is a top plan view of a magnetic disk device according to one embodiment of the present invention.

In the explanation below, a size of the X axis is defined as "width," a size of the Y axis is defined as "length," and a size of the Z axis is defined as "thickness" in each drawing. In the Y axis direction, an area that is close to an ABS (hereinafter, referred as an opposing medium surface) is defined as "front," and an area that is opposite side of the front is defined as "rear (or posterior)." The laminated up direction of an element is defined as "above" or "upper side," and the opposite direction is defined as "below" or "lower side."

[GMR Element in CPP-Type Structure (CPP-GMR Element)]

A detailed description of a structure of a reproducing head of a giant magnetoresistive effect element in a CPP-type structure (CPP-GMR element) according to the present invention is given below with reference to FIG. 1.

As described above, FIG. 1 is a sectional view corresponding to a section of a reproducing head parallel to an ABS.

As shown in FIG. 1, the CPP-GMR element according to the present embodiment includes a first shield layer 3 and a second shield layer 5 that are spaced apart and opposed to each other in upper and bottom directions on the sheet, a giant magnetoresistive effect element 8 (hereinafter referred simply to as "GMR element 8") interposed between the first shield layer 3 and the second shield layer 5, an insulating layer 4 adapted to cover two sides of the GMR element 8 and a part of the upper surface of the first shield layer 3 along those sides, and two bias magnetic field application layers 6 adjacent to the two sides of the GMR element 8 through the insulating layer 4.

In this embodiment, the first shield layer 3 and the second shield layer 5 take a so-called magnetic shield role and a role of a pair of electrodes. In other words, they have not only a function of shielding magnetism but also a function of a pair of electrodes provided to enable a sense current to flow in a direction intersecting the plane of each of the layers forming the GMR element 8, for instance, in a direction perpendicular to the plane of each of the layers forming the GMR element 8 (lamination direction). For this reason, the first shield layer 3 and the second shield layer 5 may be referred to as a "lower electrode layer 3" and an "upper electrode layer 5," respectively.

In addition to the first shield layer 3 and the second shield layer 5, another pair of electrodes may be provided above and below the GMR element 8.

A reproducing head according to the present invention includes the GMR element 8 in a CPP-type structure as a main part of the present invention.

As an easily understandable explanation for the concept of a structure of the GMR element 8 in CPP-type structure according to the present invention shown in FIG. 1, the structure has a spacer layer 40, and a free layer 50 and a magnetic pinned layer 30, which are laminated to sandwich the spacer layer 40.

In a preferred embodiment shown in FIG. 1, the free layer 50 is formed before the magnetic pinned layer 30 is formed and is a layer provided in a lower part of the structure. A magnetization direction of the free layer 50 varies depending on an externally applied magnetic field. A magnetization direction of the magnetic pinned layer 30 is pinned. The angles of the magnetization directions of the magnetic pinned layer 30 and free layer 50 relatively changes due to an externally applied magnetic field. As a sense current flows through a lamination direction of the GMR element 8, it causes the element to perform its own function. In other words, it is the GMR element 8 in the current perpendicular to plane (CPP) type structure.

In the preferred embodiment shown in FIG. 1, as discussed above, the magnetic pinned layer 30 is formed in an upper part of the structure relative to the free layer 50. Therefore, an antiferromagnetic layer 22 is formed in an upper part relative to the magnetic pinned layer 30. This structure in the embodiment is referred to as a top-type structure.

A cap layer 26 is formed on the antiferromagnetic layer 22.

An under layer 21 is formed below the free layer 50. The under layer 21 can be considered to have an additional function as a part of an electrode that connects to the first shield layer 3. In this sense, the under layer 21 is also referred to as pseudo-electrode under layer 21.

A detailed explanation of each structure is given below.

[Explanation of Free Layer 50]

The free layer 50 is a layer of which a magnetization direction varies depending on an externally applied magnetic field, i.e., a signal magnetic field from a recording medium. The free layer 50 is made of a CoFe alloy system in which a CoFe alloy or CoFe is a main component, the free layer 50 being a ferromagnetic layer with a small coercivity (soft magnetic layer). The free layer 50 has a thickness of, for example, approximately 2 to 10 nm.

The free layer 50 that is made of CoFe according to the present invention is formed with a (001) crystal plane orientation toward a lamination direction (hereinafter, "crystal plane" may be referred to as "plane").

A (001) crystal plane orientation of CoFe functioning as the free layer 50 is not conventional in the technology area of the present invention. The reasons why are given below.

A basic crystal structure of CoFe is a BCC structure. A close-packed plane of BCC-CoFe is a (110) crystal plane. Therefore, a BCC-CoFe layer formed with regular layer forming conditions has a (110) plane orientation. If, for example, a Cu layer as a spacer layer is formed on this layer, the Cu layer has a (111) plane orientation. In this situation, it could be said that a degree of mismatch is relatively small. In lamination layers of close packed planes, even though there is only a small mismatch in its lattice, a lattice defect is unavoidable. Since this lattice defect causes a spin scattering, an increase of an MR ratio is prevented.

In contrast, the free layer 50 according to the present invention has a (001) plane orientation as discussed above. When a Cu layer is formed on this free layer 50 with a (001) plane orientation, a spacer layer 40 made of Cu has a (001) plane orientation. Cu is usually an FCC structure; however, Cu formed by the method described above is a BCC structure.

In the present invention, since a (001) plane of the Cu layer as the spacer layer 40 is formed on a (001) plane of the BCC-CoFe alloy as the free layer 50, a structure is configured in which spin scattering is small by assimilating atomic scale differences. The forming structure of the CoFe (001)-Cu (001) does not exist in the prior art.

[Explanation of Spacer Layer 40]

As discussed above, a spacer layer 40 according to the present invention is configured with Cu having a (001) plane orientation, and a layer thickness of approximately 1 to 5 nm.

The most critical aspect is that the free layer 50 and the spacer layer 40 are formed in the (001) plane orientation.

[Explanation of Magnetic Pinned Layer 30]

In the preferred embodiment according to the present invention, the magnetic pinned layer 30 is made of a CoFe alloy system in which a CoFe alloy or CoFe is a main component is formed on the Cu layer that is the spacer layer 40. The magnetic pinned layer 30 has a thickness of, for example, approximately 2 to 10 nm.

As shown in FIG. 1, the magnetic pinned layer 30 is magnetically pinned by an influence of the antiferromagnetic layer 22 that is formed on the magnetic pinned layer 30 and that performs a pinning function.

In the present invention, it is particularly preferred that the CoFe layer configuring the magnetic pinned layer 30 is oriented in a (001) plane on the Cu layer configuring the spacer layer 40, and that the CoFe layer is epitaxially-formed on the Cu layer.

[Explanation of Antiferromagnetic Layer 22]

As discussed above, since the antiferromagnetic layer 22 is exchange-coupled with the magnetic pinned layer 30, the antiferromagnetic layer 22 functions to pin a magnetization direction of the magnetic pinned layer 30.

The antiferromagnetic layer 22 is made of an antiferromagnetic material at least containing one element M' and Mn. Herein, the element M' is selected from a group, for example, consisting of Pt, Ru, Rh, Pd, Ni, Cu, Ir, Cr, and Fe. The Mn content is preferably 35 to 95% by atomic weight. The antiferromagnetic materials are categorized in two types:

(1) non-heat treatment type antiferromagnetic materials that exhibit antiferromagnetism without heat treatment and induce an exchange-coupled magnetic field between themselves and a ferromagnetic material; and (2) heat treatment type antiferromagnetic materials that exhibit antiferromagnetism with heat treatment. In the above type (1), heat treatment is usually conducted to align an exchange-coupling direction. Either type, (1) or (2), can be used in the present invention. Examples of non-heat treatment type antiferromagnetic materials include RuRhMn, FeMn, and IrMn. Examples of heat treatment type antiferromagnetic material include PtMn, NiMn, and PtRhMn.

The antiferromagnetic layer 22 has a thickness of approximately 4 to 30 nm.

[Explanation of Under Layer 21]

The under layer 21 is formed below the free layer 50. As mentioned above, the under layer 21 can be considered to have an additional function as a part of an electrode that connects to the first shield layer 3 (lower electrode layer 3). In this sense, the under layer 21 is also called a pseudo-electrode under layer 21.

A lamination structure of the preferred under layer 21 shown in FIG. 1 is explained.

As shown in FIG. 1, the under layer 21 is configured with the following lamination layers in a bottom up direction: (1) a Ta layer with reference numeral 21a, (2) a NiFeN layer with 21b, (3) a Cu layer with 21c, and (4) a Fe$_4$N layer with 21d.

Ta Layer 21a

The Ta layer 21a is made from a thin film in amorphous status. The Ta layer 21a functions as a resetter for preventing an orientation influence caused by the first shield layer 3 (lower electrode layer 3).

The Ta layer 21a has a thickness of approximately 1 to 20 nm. It is not necessary to use Ta when another material functions to reset an orientation influence. For example, Zr, Hf, CoFeB, CoZrTa, and so on, can be used instead of Ta.

NiFeN Layer 21b

The NiFeN layer 21b is formed on the Ta layer 21a and has a thickness of approximately 0.5 to 20 nm. The NiFeN layer 21b is configured with a (001) plane orientation. The NiFeN layer 21b with the (001) plane orientation is formed by a sputtering method in an argon atmosphere to which a nitrogen gas is added with NiFe as a target. The content ratio of nitrogen in the layer is approximately 0.5 to 25% by atomic weight. More preferably, it is 2 to 15% by atomic weight.

When the content of nitrogen exceeds the range mentioned above, the (001) plane orientation of the NiFeN layer 21b is difficult to achieve. The NiFeN layer 21b with the (001) plane orientation is a preliminary arrangement to affect an influence on the (001) plane orientation of the free layer 50.

Cu Layer 21c and Fe$_4$N Layer 21d

The Cu layer 21c and the Fe$_4$N layer 21d are respectively formed on or above the NiFeN layer 21b in this order and are configured with a (001) plane orientation.

The Cu layer 21c is formed primarily for increasing crystallinity of a free layer and a spacer layer.

The Fe$_4$N layer 21d is formed to coordinate a distance of the crystalline lattice by expanding it. The Fe$_4$N layer 21d has a thickness of approximately 2 to 20 nm.

[Explanation of Cap Layer 26]

As shown in FIG. 1, a cap layer 26 that is made of, for example, a Ta layer or a Ru layer is formed on the antiferromagnetic layer 22. The cap layer 26 has a thickness of approximately 0.5 to 20 nm.

[Explanation of Functions for Main Parts of Present Invention]

In a conventional CPP-GMR element that has a structure of CoFe (magnetic layer)/Cu (spacer layer)/CoFe (magnetic layer), in which the Cu spacer layer is sandwiched between two CoFe ferromagnetic layers, a technology in which (110) planes that are closely-packed are laminated is used for a BCC-CoFe alloy that functions as a magnetic layer for an MR element. Due to the structure, a large MR ratio cannot be obtained by the CPP-GMR element having the CoFe (magnetic layer)/Cu (spacer layer)/CoFe (magnetic layer) structure.

In contrast, in the present invention, since a (001) plane of a BCC-CoFe alloy and a (001) plane of a nonmagnetic metal configured for a spacer layer are united, a structure is realized in which spin scattering is small by assimilating atomic scale differences. It is quite different from the conventional art.

Further, as will be explained below, a layer configuration is realized in which a (001) plane of a magnetic layer and a (001) plane of a nonmagnetic layer (spacer layer) are both grown to form the lamination structure, and where the (001) plane is not a closely-packed, thereby increasing an MR ratio.

A closely-packed plane of BCC-CoFe is a (110) plane. When a Cu layer is formed on a BCC-CoFe layer under ordinary conditions, the Cu layer is oriented in a (111) plane. A mismatch ratio in its lattice is small in the above structure. However, if there is a mismatching of the lattices, regardless of the size of the mismatch, lattice defects will unavoidably exist in the lamination layer on which the closely-packed planes face each other. The defect causes spin scattering.

In contrast, a BCC-CoFe alloy is first oriented in a (001) plane. Then, a Cu layer is formed on the BCC-CoFe alloy. The Cu layer has a BCC structure rather than a typical FCC structure. The Cu layer is oriented in a (001) plane. (It seems that since lattice distortion in the Cu layer occurs due to a pulling force from a lattice in the layer underneath, the Cu layer has the BCC structure.) With the structure, considering ratios either of Cu atoms and Co atoms or of Cu atoms and Fe atoms that exist in the vicinity of the interface, a contact ratio with a magnetic element becomes larger compared with a (110) orientation structure. Therefore, a mutual interaction between Cu in the interface and Co or Fe becomes strong so that polarizability of Co, Fe, and Cu is increased. With the phenomenon mentioned above, since a spin polarizability is increased in a (001) orientation system compared to a (110) orientation system, an increase of an MR ratio can be achieved. At the same time, the problem of small differences minute in atomic size is resolved by forming a plane other than a close-packed plane, so that spin scattering becomes small. This also contributes to an increase in an MR ratio.

[Explanation of Overall Structure of Thin Film Magnetic Head]

FIG. 2 shows a sectional view (i.e., a cross section taken through the Y-Z plane) of a thin film magnetic head in parallel with the so-called air bearing surface (ABS).

A thin film magnetic head 100 as shown in FIG. 2 is mounted on a magnetic recording device such as a hard disk drive in order to magnetically process a recording medium 10 such as a hard disk that moves in a medium traveling direction M.

The thin film magnetic head 100 as exemplified in the drawing is a so-called complex type head that is executable for both recording processing and reproducing processing as magnetic processing. As shown in FIG. 2, it has a structure of a magnetic head part 101 formed on a slider substrate 1 structured of ceramic material such as ALTIC ($Al_2O_3$.TiC).

A magnetic head part 101 has a lamination constitution of a reproducing head part 100A for reproducing magnetic information recorded using the MR effect and, for example, a shield type recording head part 100B for executing the recording processing of the perpendicular recording system.

A description is given below in more detail.

A first shield layer 3 and a second shield layer 5 are flat layers formed in a manner of being substantially parallel to the side surface 1a of the slider substrate 1. These layers 3 and 5 form a part of the ABS that is the ABS 70.

An MR effect part 8 is sandwiched between the first shield layer 3 and the second shield layer 5 and forms part of the ABS 70. A height perpendicular to the ABS 70 (i.e., in the Y direction) is an MR height (MR-h).

The first shield layer 3 and the second shield layer 5 are formed by a pattern plating method including a frame plating method, for example.

The MR effect part 8 is a lamination layer substantially parallel to the side surface 1a of the slider substrate 1, and forms a part of the ABS 70.

The MR effect part 8 is a lamination layer in a film surface perpendicular type (or current perpendicular to plane: CPP) structure in which a sense current flows in the direction perpendicular to the laminating surface.

Moreover, as shown in FIG. 2, an interelement shield layer 9 made of the same material as that of the second shield layer 5 is formed between the second shield layer 5 and the recording head part 100B.

The interelement layer 9 functions in a manner of shielding the MR element 8 that functions as a sensor from a magnetic field generated by the recording head part 100B, thereby blocking exogenous noises at the time of reproducing. A bucking coil part may also be formed between the interelement layer 9 and the recording head part 100B. The bucking coil part is to generate magnetic flux that overrides a magnetic flux loop that is generated by the recording head part 100B and passes through the upper and lower electrode layers of the MR element 8 and, therefore, acts in a manner of suppressing unnecessary writing to a magnetic disk or wide area adjacent tracks erasing (WATE) phenomena that are erasing operations.

Insulating layers 4 and 44 made of alumina, etc. are formed as follows:

i) in a gap between the first shield layer 3 and the second shield layer 5 on the side opposite to the ABS 70 of the MR element 8;

ii) in rear (posterior) regions of the first and second shield layers 3 and 5 and the interelement shield layer 9, the rear regions being opposite to the ABS 70;

iii) in a gap between the first shield layer 3 and the slider substrate 1; and iv) in a gap between the interelement shield layer 9 and the recording head part 100B.

The recording head part 100B is preferably structured for perpendicular magnetic recording and, as shown in FIG. 2, has a main magnetic pole layer 15, a gap layer 18, a coil insulating layer 26, a coil layer 23, and an auxiliary magnetic pole layer 25. The perpendicular recording system can be exchanged with a so-called longitudinal recording system.

The main magnetic pole layer 15 is structured to be a leading magnetic path for leading and focusing magnetic flux initiated by the coil layer 23 to the recording layer of a magnetic recording medium 10 to be written. It is preferred that the end part of the main magnetic pole layer 15 on the side of the ABS 70 should be smaller in thickness compared with other portions in the track width direction (i.e., the direction along the X-axis in FIG. 2) and in the laminating direction (i.e., the direction along the Z-axis in FIG. 2). As a result, it is possible to generate a magnetic field for minute and strong writing corresponding to high recording density.

On the end part of the auxiliary magnetic pole layer 25 magnetically coupled with the main magnetic pole layer 15 on the side of the ABS 70 is formed a trailing shield part that has a wider layer cross section than the other portions of the auxiliary magnetic layer 25. As shown in FIG. 2, the auxiliary magnetic pole layer 25 is disposed in a manner of being opposed to the end part of the main magnetic pole layer 15 on the side of the ABS 70 via the gap layer 18 made of insulating material such as alumina and the coil insulating layer 26.

The provision of the auxiliary magnetic pole layer 25 enables formation of a steep magnetic field gradient between the auxiliary magnetic pole layer 25 and the main magnetic pole layer 15 in the vicinity of the ABS 70. As a result, jitter is reduced in a signal output, thereby making the error rate smaller at the time of reproducing.

The auxiliary magnetic pole layer 25 is formed, for example, to about 0.5-5 μm in thickness by a frame plating method, a sputtering method or the like. The material may be an alloy made of two or three elements selected from the group consisting of Ni, Fe and Co, for example, or an alloy made of these elements, as main components, along with predetermined chemical elements.

The gap layer 18 is formed to separate the coil layer 23 from the main magnetic pole layer 15. The gap layer 18 may be formed by a sputtering method, a CVD method or the like, for example, have a thickness of about 0.01-0.5 μm and be structured of $Al_2O_3$, diamond-like carbon (DLC) or the like.

[Explanation of Function of Thin Film Magnetic Head]

The function of a thin film magnetic head according to the present embodiment is given below. The thin film magnetic head has a function that a recording head writes information on a recording medium, and a reproducing head reads recorded information on the recording medium.

In the reproducing head, a direction of a bias magnetic field of the bias magnetic field application layer 6 is a direction that is orthogonal to the perpendicular direction relative to the ABS (X direction in FIG. 1). In the MR element 8, a magnetization direction of the free layer 50 is equal to a direction of the bias magnetic field when there is not a signal magnetic field. A magnetization direction of the magnetic pinned layer 30 is pinned to a direction (Y direction) that is perpendicular to the ABS.

In the MR element 8, a magnetization direction of the free layer 50 is changed based on a signal magnetic field from a recording medium. Then, a relative degree between the magnetization direction of the free layer 50 and a magnetization direction of the magnetic pinned layer 30 is changed, and as a result, the resistance of the MR element 8 is changed. The resistance of the MR element 8 is obtained through an electric potential difference between two electrodes (or the first and second shield layers 3 and 5) when a sense current flows in the MR element by the first and second shield layers 3 and 5. As described above, the reproducing head is able to read recorded information on the recording medium.

[Explanation of Head Gimbal Assembly and Hard Disk Device]

Next, a head gimbal assembly on which the above mentioned thin film head is mounted and one embodiment of a hard disk device are described below.

First, a description of a slider 210 equipped with the head gimbal assembly is illustrated in FIG. 3. In the hard disk device, the slider 210 is disposed in a manner of being opposed to a hard disk that is a rotatably driven disk-like recording medium. The slider 210 is provided with a base substrate 211 mainly configured of a substrate and an overcoat.

The base substrate 211 is substantially hexahedronal. Of the six surfaces of the base substrate 211, one surface is disposed in a manner of being opposed to a hard disk. The ABS 70 is formed on the surface.

When a hard disk is rotated in the Z direction in FIG. 3, an airflow passing between the hard disk and the slider 210 creates lifting power downwardly in the Y direction in FIG. 3. The slider 210 floats from the surface of the hard disk by this lifting power. The X direction in FIG. 3 is the track traversing direction of the hard disk.

In the vicinity of the end part of the slider 210 on the air exit side (i.e., the end part on the lower left in FIG. 3), the thin film magnetic head according to the present embodiment is formed.

Next, a description of the head gimbal assembly 220 according to the present embodiment is described by referring to FIG. 4. The head gimbal assembly 220 is provided with the slider 210 and a suspension 221 for elastically supporting the slider 210. The suspension 221 has a plate spring load beam 222 formed of stainless steel, a flexure 223 that is provided on one end part of the load beam 222 and joined with the slider 210 in a manner of giving the slider 210 a proper degree of freedom, and a base plate 224 provided on the other end part of the load beam 222.

The base plate 224 is mounted on an arm 230 of an actuator for moving the slider 210 in the track traversing direction X of the hard disk 262. The actuator has the arm 230 and a voice coil motor for driving the arm 230. A gimbal part is provided for keeping a posture of the slider 210 constant on the portion of the flexure 223 on which the slider 210 is mounted.

The head gimbal assembly 220 is mounted on the arm 230 of the actuator. One arm 230 with a head gimbal assembly 220 mounted thereon is called a head arm assembly. A carriage having multiple arms, each of which has a head gimbal assembly mounted thereon, is referred as a head stack assembly.

FIG. 4 shows one embodiment of a head arm assembly. In this head arm assembly, a head gimbal assembly 220 is mounted on one end part of the arm 230. A coil 231, part of a voice coil motor, is mounted on the other end part of the arm 230. A bearing part 233 is provided in the middle part of the arm 230 so that a shaft 234 is rotatably supported.

A description of one example of the head stack assembly and the hard disk device according to the present embodiment is described by referring to FIG. 5 and FIG. 6.

FIG. 5 is an illustration for explaining primary parts of a hard disk device. FIG. 6 is a plan view of the hard disk device.

The head stack assembly 250 has a carriage 251 having multiple arms 252. On the multiple arms 252 are mounted multiple head gimbal assemblies 220 in the perpendicular direction at certain intervals. A coil 253, part of a voice coil motor, is mounted on the opposite side of the arms 252 in the carriage 251. The head stack assembly 250 is incorporated into a hard disk device.

A hard disk device has multiple hard disks 262 mounted on a spindle motor 261. Two sliders 210 are disposed for each hard disk 262 in a manner of being opposed to each other by sandwiching the hard disk 262. The voice coil motor has permanent magnets 263 disposed in a manner of being opposed to each other by sandwiching the coil 253 of the head stack assembly 250.

The head stack assembly 250 and an actuator except for sliders 210 support as well as locate the slider 210 relative to the hard disk 22 corresponding to a positioning device of the present invention.

In the hard disk device according to the present embodiment, an actuator allows moving sliders 210 in the track traversing direction of the hard disk 262 in order to position sliders 210 relative to the hard disk 262. Thin film magnetic heads included in sliders 210 record information on the hard disk 262 by the recording head and reproduce (or read) information recorded in the hard disk 262 by the reproducing head.

The head gimbal assembly and hard disk device according to the present embodiment are as effective as the thin film magnetic head according to the above-mentioned embodiment.

In the embodiment, it is explained that a thin film magnetic head has a structure of a reproducing head part formed on the base substrate side and a perpendicular recording head part layered thereon. However, the layering order may be reversed. Moreover, the configuration may be such that only a reproducing part is provided in the case of a reproduction-only thin film head.

EXEMPLARY EMBODIMENT

The present invention related to a CPP-GMR element discussed above is explained through a detailed exemplary embodiment.

Embodiment 1

A CPP-GMR element configured with a lamination structure as shown in Table 1 below was formed by a sputtering method. This is Sample 1 of an embodiment according to the present invention.

As shown in Table 1, a basic structure of a lamination structure is that an under layer 21 (pseudo-electrode under layer 21) was formed on a lower shield layer 3 that has a layer thickness of 1000 nm and that was made of NiFe. The under layer 21 was configured with the following lamination layers in a bottom up direction: a Ta layer with a layer thickness of 2 nm; a NiFeN layer with a layer thickness of 5 nm; a Cu layer with a layer thickness of 10 nm; and a $Fe_4N$ layer with a layer thickness of 5 nm.

The Ta layer was in an amorphous state and had a function to reset an orientation. The NiFeN layer was formed by a sputtering method in an argon gas atmosphere to which a nitrogen gas was added with NiFe as a target. A content rate of nitrogen in the NiFeN layer was 3% by atomic weight, and it was confirmed that the NiFeN layer was oriented in a (001) plane. It was also confirmed that the Cu layer and $Fe_4N$ layer that were formed on the NiFeN layer in this order were oriented in a (001) plane.

A free layer 50 made of a CoFe layer with a layer thickness of 4 nm was formed on the under layer 21. A crystal structural analysis with respect to a crystalline orientation was performed through an X-ray diffraction (XRD) measurement and a transmission electron microscope (TEM) observation. It was confirmed that this CoFe layer (free layer 50) was oriented in a (001) plane.

Next, a spacer layer 40 made of a Cu layer with a layer thickness of 3 nm was formed on the CoFe layer (free layer 50). A crystal structural analysis with respect to a crystalline orientation was performed through an XDR measurement and a TEM observation. It was confirmed that this Cu layer (spacer layer 40) was oriented in a (001) plane.

Then, a magnetic pinned layer 30 made of a CoFe layer with a layer thickness of 4 nm was formed on the Cu layer (spacer layer 40). A crystal structural analysis with respect to a crystalline orientation was performed through an XDR measurement and a TEM observation. It was confirmed that this CoFe layer (magnetic pinned layer 30) was oriented in a (001) plane.

An antiferromagnetic layer 22 made of a MnIr layer with a layer thickness of 7.5 nm was formed on the CoFe layer (magnetic pinned layer 30). With influence from this antiferromagnetic layer 22, magnetization of the CoFe layer (magnetic pinned layer 30) was pinned.

A cap layer configured with two layers, Ru with a thickness of 10 nm and Ta with a thickness of 2.0 nm, was formed on the antiferromagnetic layer 22.

A lamination layer discussed above that forms a main structure of an element was fabricated in a quadrangular prism shape with dimensions of 200 nm×200 nm. Then, an insulating layer ($Al_2O_3$) with a layer thickness of 20.0 nm covered sides of the fabricated quadrangular prism shape, and an upper electrode layer (Cu 20 nm) was formed at the top portion. As a result, Sample 1 of the present embodiment according to the present invention was made.

TABLE 1

(Embodiment)

| Lamination Structure | Layer Material | Layer Thickness (nm) |
|---|---|---|
| Cap Layer (26) | Ta | 2.0 |
| | Ru | 10.0 |
| Antiferromagnetic Layer (22) | MnIr | 7.5 |
| Magnetic Pinned Layer (30) | CoFe | 4.0 |
| Spacer Layer (40) | Cu | 3.0 |
| Free Layer (50) | CoFe | 4.0 |
| Under Layer (21) | $Fe_4N$ | 5.0 |
| | Cu | 10.0 |
| | NiFeN | 5.0 |
| | Ta | 2.0 |
| Lower Shield Layer (3) | NiFe | 1000 |

[Comparison Sample 1]

In Sample 1 of the present embodiment according to the present invention, Comparison Sample 1 was formed for inserting a Ta layer with a layer thickness of 1 nm between the $Fe_4N$ layer as the under layer 21 and the free layer 50.

Other than that, Comparison Sample 1 was formed with a laminated structure described in Table 2 below through the similar processes of Sample 1.

In Comparison Sample 1, since an amorphous Ta layer with a layer thickness of 1 nm was formed on a $Fe_4N$ layer as an under layer 21, a (001) orientation condition of the under layer, laminated NiFeN, Cu, and $Fe_4N$ layers, was canceled based on the amorphous Ta layer.

In fact, a CoFe layer was oriented in a (110) plane. The CoFe layer was a free layer 50 and was formed on the amorphous Ta layer. A Cu layer as a spacer layer 40 that was formed on the CoFe layer (free layer 50) was oriented in a (111) plane.

A CoFe layer as a magnetic pinned layer 30 that was formed on the Cu spacer layer 40 was oriented in a (110) plane.

TABLE 2

(Comparison)

| Lamination Structure | Layer Material | Layer Thickness (nm) |
|---|---|---|
| Cap Layer (26) | Ta | 2.0 |
| | Ru | 10.0 |
| Antiferromagnetic Layer (22) | MnIr | 7.5 |
| Magnetic Pinned Layer (30) | CoFe | 4.0 |
| Spacer Layer (40) | Cu | 3.0 |
| Free Layer (50) | CoFe | 4.0 |
| Under Layer (21) | Ta | 1.0 |
| | $Fe_4N$ | 5.0 |
| | Cu | 10.0 |
| | NiFeN | 5.0 |
| | Ta | 2.0 |
| Lower Shield Layer (3) | NiFe | 1000 |

With respect to Sample 1 and Comparison Sample 1 formed by the above conditions in Table 1 and Table 2, respectively, (1) an area resistivity AR ($\Omega \cdot \mu m^2$) of an MR element and (2) an MR ratio were obtained through the following procedures.

(1) Area Resistivity AR ($\Omega \cdot \mu m^2$) of Element

It was measured by a DC four-probe method. The number of samples was 100 (n=100), and the AR was calculated through an average of ARs of 100 samples.

(2) MR Ratio

An MR ratio was measured by an ordinary DC four-probe method. The MR ratio was calculated through dividing "a variation of a resistance $\Delta R$" by "a resistance R," represented as $\Delta R/R$. The number of samples was 100 (n=100), and the MR ratio was calculated through an average of MRs of 100 samples.

It is noted that with respect to the MR ratio, when the MR ratio of Comparison Sample 1 is set as a value of "1," the MR ratio of Sample 1 of the present embodiment is shown in its relative value.

The results are shown in Table 3 below.

TABLE 3

| | Area Resistivity AR ($\Omega \cdot \mu m^2$) | MR Ratio (Relative Value) |
|---|---|---|
| Sample 1 | 0.06 | 1.2 |
| Comparison Sample 1 | 0.07 | 1.0 |

According to the experimental results above, an effect of the present invention is apparent.

The MR element of the present invention that is a giant magnetoresistive effect element in a current perpendicular to plane (CPP) structure includes a spacer layer made of Cu, a magnetic pinned layer containing CoFe and a free layer containing CoFe that are laminated to sandwich the spacer layer, in which a sense current flows along a lamination direction of the layers. The free layer is formed before the magnetic pinned layer is formed, and is located below the magnetic pinned layer, a magnetization direction of the free layer varies depending on an externally applied magnetic field, a magnetization direction of the magnetic pinned layer is pinned. The free layer is oriented in a (001) crystal plane, the spacer layer is formed and oriented in a (001) crystal plane on the (001) crystal plane of the free layer. Therefore, in a low resistance area that has an AR of an MR element is, for example, lower than $0.3\ \Omega\cdot\mu m^2$, an MR element that has a large variation of a resistance is obtained.

Possibilities for the industrial use of the present invention include its use in a magnetic disk device with an MR element that detects magnetic field intensity as a signal from a magnetic recording medium, and so on.

What is claimed is:

1. A magnetoresistive effect element (MR element) that is a giant magnetoresistive effect element in a current perpendicular to plane (CPP) structure, comprising:
   a spacer layer made of Cu;
   a magnetic pinned layer containing CoFe and a free layer containing CoFe that are laminated to sandwich the spacer layer, in which a sense current flows along a lamination direction of the layers, wherein
   the free layer is located below the magnetic pinned layer,
   a magnetization direction of the free layer varies depending on an externally applied magnetic field,
   a magnetization direction of the magnetic pinned layer is pinned, and
   the free layer is oriented in a (001) crystal plane, the spacer layer is formed and oriented in a (001) crystal plane on the (001) crystal plane of the free layer.

2. The MR element according to claim 1, wherein the magnetic pinned layer is formed and oriented in a (001) crystal plane on the (001) crystal plane of the spacer layer.

3. The MR element according to claim 1, wherein an under layer containing a NiFeN layer that is oriented in a (001) crystal plane is formed below the free layer, the free layer is a first ferromagnetic layer and is formed on the under layer, and the spacer layer is formed on the first ferromagnetic layer.

4. The MR element according to claim 3, wherein the magnetic pinned layer is formed and oriented in a (001) crystal plane on the (001) crystal plane of the spacer layer.

5. A thin film magnetic head comprising:
   an air bearing surface (ABS) that is opposite to a recording medium;
   the magnetoresistive effect element (MR element) according to claim 1 that is provided in the vicinity of the ABS to detect a signal magnetic field from the recording medium; and
   a pair of electrodes that apply an electric current in a lamination direction of the MR element.

6. A head gimbal assembly comprising:
   a slider having the thin film magnetic head according to claim 5 and being provided opposite to a recording medium; and
   a suspension elastically supporting the slider.

7. A magnetic disk device comprising:
   a slider having the thin film magnetic head according to claim 5 and being provided opposite to a recording medium; and
   a positioning device supporting the slider and locating a position of the slider with respect to the recording medium.

* * * * *